United States Patent [19]

Yamamoto et al.

[11] Patent Number: 4,637,681

[45] Date of Patent: Jan. 20, 1987

[54] OPTICAL PLANE CIRCUIT WITH AN OPTICAL COUPLER AND A METHOD FOR MANUFACTURING THE SAME

[75] Inventors: Noboru Yamamoto; Tetsuya Yamasaki, both of Hyogo, Japan

[73] Assignee: Nippon Sheet Glass Co., Ltd., Osaka, Japan

[21] Appl. No.: 696,314

[22] Filed: Jan. 30, 1985

Related U.S. Application Data

[63] Continuation of Ser. No. 382,965, May 28, 1982.

[30] Foreign Application Priority Data

Jun. 1, 1981 [JP] Japan ................... 56-82522

[51] Int. Cl.$^4$ ............. G02B 6/10; H01L 21/306; C23F 1/00
[52] U.S. Cl. ................. 350/96.12; 350/96.11; 350/96.15; 350/96.17; 350/96.18; 156/643; 156/644
[58] Field of Search ............ 350/96.11, 96.12, 96.13, 350/96.14, 96.15, 96.16, 96.17, 96.18; 65/3.11, 3.14, 3.31, 37, 38, 1, 3.12; 156/625, 643, 644; 29/569 R, 572, 576 B, 576 C

[56] References Cited

U.S. PATENT DOCUMENTS

| | | | |
|---|---|---|---|
| 4,087,315 | 5/1978 | Auracher et al. | 156/656 |
| 4,375,312 | 3/1983 | Tangonan | 350/96.12 |
| 4,403,825 | 9/1983 | Tangonan et al. | 350/96.11 |
| 4,547,262 | 10/1985 | Spillman, Jr. et al. | 156/659.1 |

FOREIGN PATENT DOCUMENTS

| | | | |
|---|---|---|---|
| 53-67453 | 6/1978 | Japan | 350/96.11 |
| 55-18881 | 5/1980 | Japan | 350/96.31 |
| 2027931 | 2/1980 | United Kingdom | 350/96.18 |

OTHER PUBLICATIONS

Schulz et al., "Multimode Geodesic Branching Components", Optics Comm., vol. 44, No. 4, 1/83, pp. 243-248.
Sottini et al., "Geodesic Optics: New Components", J. Opt. Soc. Am., vol. 70, No. 10, 10/80, pp. 1230-1234.
Righini et al., "Geodesic Lenses for Guided Optical Waves", Applied Optics, vol. 12, No. 7, 7/73, pp. 1477-1481.
Dakss et al, "Generation of Surface Wave Networks . . .", I.B.M. Tech. Disc. Bull., vol. 12, No. 11, 4/70, pp. 1942-1943.

*Primary Examiner*—William L. Sikes
*Assistant Examiner*—Brian M. Healy
*Attorney, Agent, or Firm*—Woodcock Washburn Kurtz Mackiewicz & Norris

[57] ABSTRACT

An optical plane circuit has a transparent substrate such as a glass plate and a synthetic resin plate, an optical waveguide, and a graded index type lens to serve as an optical coupler which improves the input and/or output efficiency of a light beam in and/or from the optical waveguide. The optical plane circuit does not require troublesome precision registration between the optical waveguide and the optical coupler, and an overall compact circuit may be achieved. Connection loss due to connection between the optical waveguide and the optical coupler is small. The coupling efficiency is not degraded even if the cross-sectional shape of the optical waveguide expands along the plane of the substrate. Input and/or output of a light beam into and/or from the optical waveguide may be performed with excellent efficiency and reliability. A method for manufacturing this optical plane circuit is also provided.

32 Claims, 18 Drawing Figures

OPTICAL PLANE CIRCUIT WITH AN OPTICAL COUPLER AND A METHOD FOR MANUFACTURING THE SAME

This is a continuation of application Ser. No. 382,965, filed May 28, 1982.

BACKGROUND OF THE INVENTION

1. Field of the Invention:

The present invention relates to an optical plane circuit comprising an optical waveguide formed in a transparent substrate and an optical coupler for improving input and/or output of a light beam into and/or from the optical waveguide, and to a method for manufacturing the same.

2. Description of the Prior Art:

In the fields of optical communication and optical information processing systems, an optical plane circuit wherein a small optical waveguide of a refractive index larger than that of a transparent substrate is formed on the surface or inside the substrate for achieving various functions is receiving a lot of attention as a small optical circuit. For example, when a glass plate is used as the substrate, a buried-type optical waveguide is known to be obtained which utilizes ion exchange. Since the transmission loss of the optical waveguide obtained in this manner is assumed to be as small as 0.01 dB/cm, this optical waveguide is considered promising. However, when ion exchange is utilized, the cross section of the optical waveguide is larger in the transverse direction than in the vertical direction. For this reason, when an optical fiber or the like is directly connected to the optical waveguide, the connection loss is increased.

Figure 1:
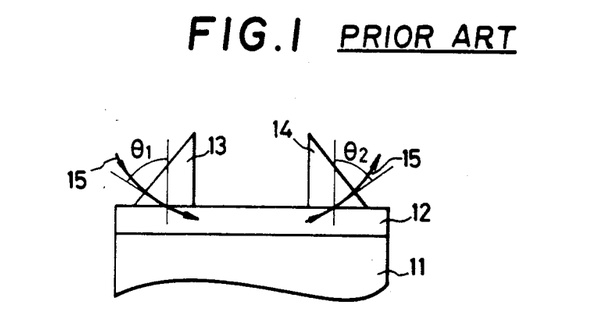
FIG. 1 is a schematic side view of a conventional optical plane circuit which has an optical coupler comprising a prism.

Various methods have been proposed for input and/or output of light into and/or from an optical plane circuit. FIG. 1 shows a method which utilizes a prism coupler. In the method shown in FIG. 1, an optical waveguide 12 having a constant or graded refractive index is formed on the front surface of the substrate 11. Prisms 13 and 14 are arranged on the surface of the optical waveguide 12 with their bottoms facing it. A light beam 15 incident on the prism 13 then becomes incident, at the bottom surface of the prism 13, on the optical waveguide 12 at an angle $\theta_1$ slightly larger than the total reflection angle and then propagates within the optical waveguide 12. When the light beam 15 reaches the bottom surface of the prism 14, the light beam 15 becomes incident on the prism 14 at an angle $\theta_2$ and then emerges to the outside.

Figure 2:
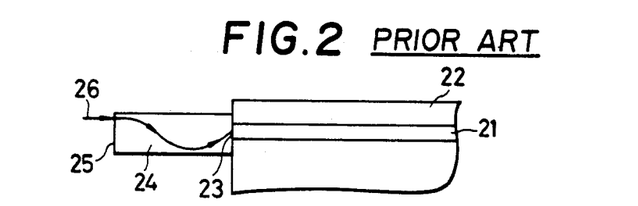
FIG. 2 is a partial, schematic side view of another conventional optical plane circuit with an optical coupler comprising a focusing rod lens.

FIG. 2 shows another method for optical coupling which uses a focusing rod lens. In the method shown in FIG. 2, one end of a focusing rod lens 24 is adhered to a side surface 23 of an optical waveguide 21 which is buried in the surface layer of a substrate 22. The overall length of the focusing rod lens 24 is selected to be odd number times of ¼ the periodical pitch of light. The other end 25 of the focusing-rod lens 24 is cut perpendicularly with respect to the central axis and optically polished. A light beam 26 becomes incident on this other end 25 perpendicularly thereto. The angle of incidence of the light beam 26 is controlled by a light output device (not shown) without bringing about changes in the position and size of the beam spot incident on the side surface of the optical waveguide.

However, the methods as shown in FIGS. 1 and 2 are subject to the drawbacks to be described below.

(a) Since the optical waveguide and the optical coupler are not formed in a single substrate, troublesome precision registration is required during assembly of these two optical circuit elements.

(b) The optical coupler is greater than the optical waveguide, so that the overall circuit cannot be made compact in size.

(c) Connection loss is caused due to connection between the optical waveguide and the optical coupler.

(d) If the cross section of the optical waveguide extends wide along the plane of the substrate, the coupling efficiency is degraded.

SUMMARY OF THE INVENTION

It is, therefore, an object of the present invention to provide an optical plane circuit with an optical coupler and a method for manufacturing the same, wherein troublesome precision registration between an optical waveguide and the optical coupler is not required.

It is another object of the present invention to provide an optical plane circuit with an optical coupler and a method for manufacturing the same, wherein the size of the optical coupler need not be great so much in comparison with an optical waveguide whereby the overall circuit may be made compact in size.

It is still another object of the present invention to provide an optical plane circuit with an optical coupler and a method for manufacturing the same, wherein connection loss due to connection of an optical waveguide and the optical coupler is eliminated.

It is still another object of the present invention to provide an optical plane circuit with an optical coupler and a method for manufacturing the same, wherein the coupling efficiency is not significantly degraded even if the transverse cross section of an optical waveguide extends along the plane of a substrate.

It is still another object of the present invention to provide an optical plane circuit with an optical coupler and a method for manufacturing the same, wherein input and/or output of a light beam into and/or from an optical waveguide may be performed with excellent efficiency and with ease.

It is still another object of the present invention to provide an optical plane circuit with an optical coupler and a method for manufacturing the same, wherein a plurality of optical plane circuit blocks may be coupled with ease.

It is still another object of the present invention to provide a method for manufacturing an optical plane circuit with an optical waveguide and an optical coupler with easy steps and reliability.

In accordance with an aspect of this invention, there is provided an optical plane circuit with an optical coupler, wherein an optical waveguide is formed in a transparent substrate, said optical coupler comprising a graded index type lens formed in said transparent substrate and serving to improve input and/or output efficiency of a light beam into and/or from said optical waveguide.

The above, and other objects, features and advantages of the invention, will be apparent in the following detailed description of illustrative embodiments of the invention which is to be read in connection with the accompanying drawings wherein the same reference numerals are used to identify the same parts in the several views.

BRIEF DESCRIPTION OF THE DRAWINGS

FIG. 5 is a view showing the refractive index distribution of the elements of the optical plane circuit shown in FIG. 3, wherein

FIG. 10 is a view showing the refractive index distribution of the optical plane circuit shown in FIG. 8, wherein

DETAILED DESCRIPTION OF THE PREFERRED EMBODIMENTS

An optical plane circuit with an optical coupler according to an embodiment of the present invention will now be described with reference to FIGS. 3 to 5. The optical plane circuit with an optical coupler comprising a graded index type lens shown in FIG. 3 is manufactured by a method including the step shown in FIG. 4.

Figure 4:
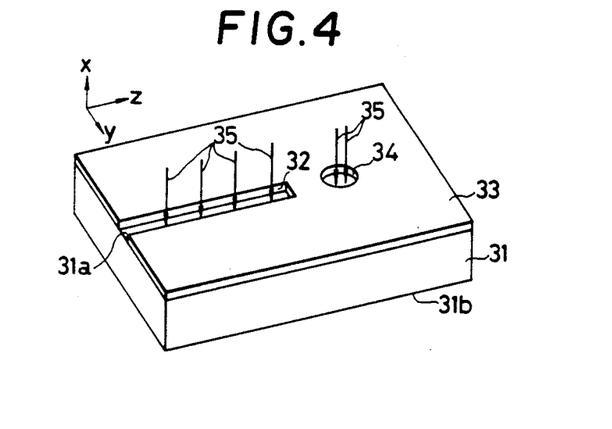
FIG. 4 is a perspective view showing a manufacturing step of the optical plane circuit with the optical coupler shown in FIG. 3.

Referring to FIG. 4, a mask 33 with an aperture 32 of a pattern is formed on the surface of a transparent substrate 31 which consists of a dielectric substance such as a glass or synthetic resin. The pattern of the aperture 32 is a linear pattern, a curved pattern or a combination of the linear and curved patterns, extending in a band shape of narrow, substantially constant width. A circular window or hole 34 is formed in the vicinity of the terminal end of the aperture 32. The hole 34 need not be contiguous with the terminal end of the aperture 32. The distance between the hole 34 and the terminal end of the aperture 32 may be selected freely depending upon the size and performance of a graded index type lens required. Furthermore, the hole 34 need not be circular in shape but may be of a block shape such as an elliptic shape depending upon the shape of the graded index type lens required.

In the next step, ions from a diffusion source 35 are diffused into the substrate 31 through the band-shaped aperture 32 and the hole 34, thus establishing a predetermined refractive index distribution to be described below in the substrate 31.

Figure 3:
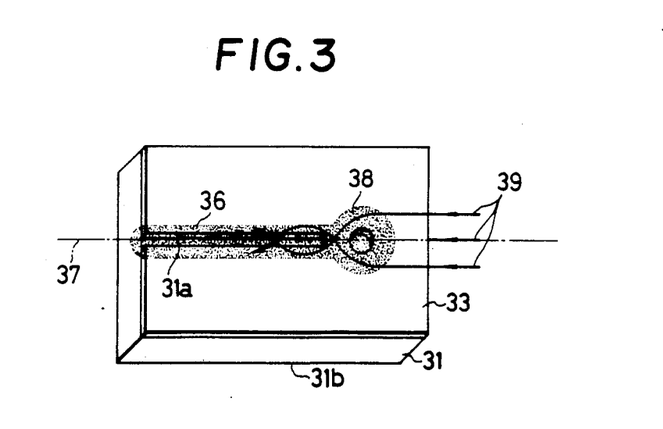
FIG. 3 is a perspective view of an optical plane circuit with an optical coupler according to an embodiment of the present invention.
Figure 5A:
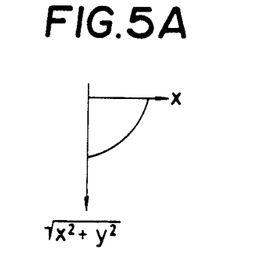
FIG. 5A is a view showing the refractive index distribution of the optical waveguide in the direction to separate from the central line of the surface of the substrate substantially perpendicularly thereto.
Figure 5B:
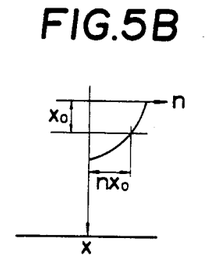
FIG. 5B shows the same of the graded index type lens in the axial direction.
Figure 5C:
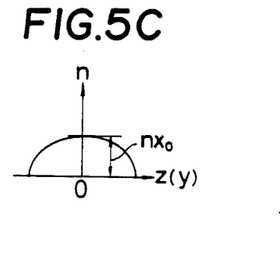
FIG. 5C shows the same of the graded index type lens in the direction perpendicular to the axial direction thereof.

FIGS. 5A, 5B and 5C show examples of the refractive index distributions of the circuit elements of the optical plane circuit shown in FIG. 3. FIG. 5A shows the refractive index distribution of an optical waveguide 36 of a band shape in the direction to separate from a central line 37 of the surface of the optical waveguide 36 substantially perpendicularly thereto. Referring to FIG. 5A, the refractive index gradually decreases by square approximation to form an overall arc-shaped distribution. The refractive index does not vary along the z-axis along the central line 37.

FIG. 5B shows the refractive index distribution of a graded index type lens along the axial direction thereof (x-axis or the direction of thickness of the substrate 31) of the optical plane circuit shown in FIG. 3. The refractive index gradually decreases by square approximation from a front surface $31a$ to a rear surface $31b$ of the substrate 31 to form an overall arc-shaped distribution.

FIG. 5C shows the refractive index distribution, in the direction perpendicular to the axial direction described above, of the graded index type lens of the optical plane circuit shown in FIG. 3 (the refractive index distribution at any point $x_o$ on the x-axis along the y- and z-axes). The refractive index gradually decreases by square approximation in the direction to separate from the axis to form an overall semicircular distribution.

The predetermined refractive index distributions by diffusion of the ions from the diffusion source 35 in the substrate 31 may be obtained by the methods to be described below.

According to the first method, a transparent substrate 31 is prepared from a glass plate containing ions of a first element which is capable of constituting a modified oxide glass. Then, ions of a second element are diffused into the transparent substrate 31, which contributes to the increase in the refractive index of the glass plate more than the ions of the first element and which is also capable of constituting a modified oxide glass, thus substituting the ions of the first element with those of the second element. According to the second method, a transparent substrate 31 of a synthetic resin which is a transparent polymer is prepared. A monomer which is capable of copolymerization with this transparent polymer to increase the refractive index is diffused into the transparent substrate 31 to cause copolymerization of the monomer with the transparent polymer.

According to the first method, if the transparent substrate 31 is an optical glass "BK-7" (68.9% by weight of $SiO_2$, 10.1% by weight of $B_2O_3$, 8.8% by weight of $Na_2O$, 8.4% by weight of $K_2O$, and 2.8% by weight of BaO), the diffusion source 35 may be a molten salt mixture consisting of 30 mol % of $Tl_2SO_4$, 40 mol % of $ZnSO_4$, and 30 mol % of $K_2SO_4$. According to the second method, if the transparent substrate 31 is a substrate prepared by adding 30% by weight of benzoyl peroxide to the allyl diglycol carbonate resin (so-called CR-39), and heating the mixture for semipolymerization, the diffusion source 35 may be a vinyl benzoate (VB) monomer. Since these methods are well known, a further description will not be made.

When parallel light beams 39 become incident, parallel to the front surface 31a of the substrate 31, on one side surface of the graded index type lens 38 of the optical plane circuit shown in FIG. 3, these parallel light beams 39 are focused by the lens 38 and emerge from the opposite side surface. The focused light beams then become incident on the band-shaped optical waveguide 36. Various modifications may be made by selecting the size and the refractive index gradient of the lens 38.

Figure 6:
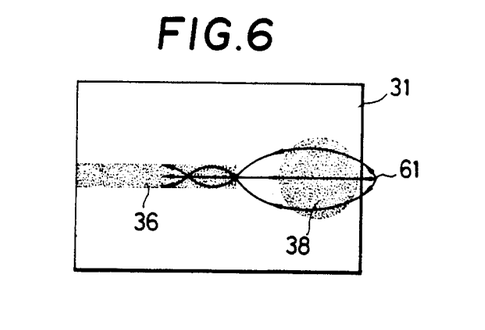
FIG. 6 is a plan view of a modification of the optical plane circuit shown in FIG. 3.

FIG. 6 is a plan view showing a modification of the optical plane circuit shown in FIG. 3. In the optical plane circuit shown in FIG. 6, the graded index type lens 38 is formed next to the optical waveguide 36 with a distance therebetween. Moreover, the graded index type lens 38 in the circuit shown in FIG. 6 is larger than that shown in FIG. 3. Referring to FIG. 6, dispersed light beams 61 from a small light source such as a semiconductor laser or an LED or from an optical fiber or the like are focused on the band-shaped optical waveguide 36 with good efficiency.

Figure 7:
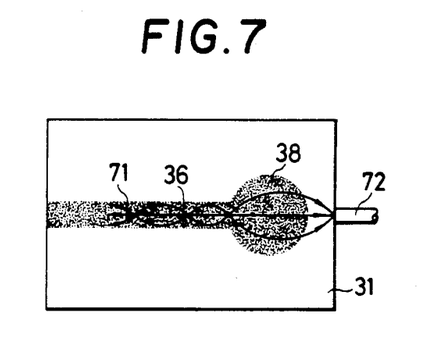
FIG. 7 is a plan view of another modification of the optical plane circuit shown in FIG. 3.

FIG. 7 is a plan view showing another modification of the optical plane circuit shown in FIG. 3. In the optical plane circuit shown in FIG. 7, the diameter of the graded index type lens 38 is larger than that of the circuit shown in FIG. 3. Referring to FIG. 7, light beams 71 propagating within the optical waveguide 36 are moderately focused by the graded index type lens 38 and form a beam spot on a light-receiving means 72 such as an optical fiber or a photodetector arranged outside the circuit.

Figure 8:
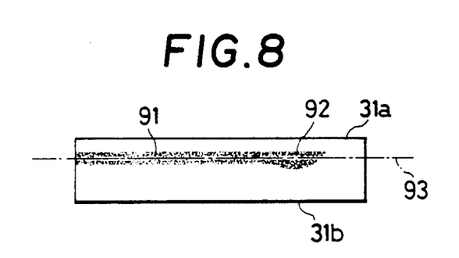
FIG. 8 is a side view showing an optical plane circuit with an optical coupler according to another embodiment of the present invention.

An optical plane circuit with an optical coupler according to another embodiment of the present invention will now be described with reference to FIGS. 8 to 10. The optical plane circuit with an optical coupler having a graded index type lens shown in FIG. 8 is manufactured by a method including the step shown in FIG. 9. In this optical plane circuit, the graded index type lens and the optical waveguide are buried within the substrate 31.

As described with reference to FIG. 4, in the step shown in FIG. 9, the mask 33 is formed on the surface of the transparent substrate 31. Ions of an element are diffused from the diffusion source 35 through the aperture 32 and the hole 34 to form the optical waveguide 36 and the graded index type lens 38. The mask 33 is removed by polishing or dissolution. Ions from another diffusion source 81 are diffused through the front surface 31a of the substrate 31 as shown in FIG. 9, which decrease the refractive indices of the optical waveguide 36 and the graded index type lens 38 to that of the transparent substrate 31. Then, the optical waveguide 91 and the graded index type lens 92 are buried inside the substrate 31.

Figure 10A:
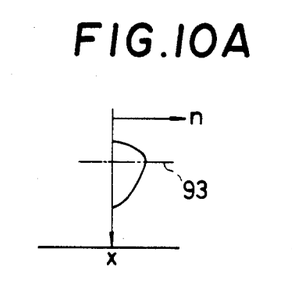
FIG. 10A shows the refractive index distribution of the optical waveguide in the direction of thickness (from the front to the rear surface) of the substrate.
Figure 10B:
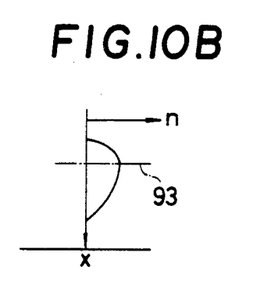
FIG. 10B shows the same of the graded index type lens in the axial direction.

FIGS. 10A and 10B show examples of the refractive index distributions of circuit elements of the optical plane circuit shown in FIG. 8 manufactured in this manner. FIG. 10A shows the refractive index distribution, in the direction from the front surface 31a to the rear surface 31b of the substrate 31, of the optical waveguide 91 of the optical plane circuit shown in FIG. 8. The refractive index gradually increases from the front surface 31a toward the rear surface 31b and then decreases from a reference axis 93 to form an overall semicircular distribution. On the other hand, FIG. 10B shows the refractive index distribution in the axial direction of the graded index type lens 92 (x-axis or the direction of thickness of the substrate 31) of the optical plane circuit shown in FIG. 8. The refractive index first increases from the front surface 31a toward the rear surface 31b of the transparent substrate 31 and then decreases from the reference axis 93 to form an overall semicircular distribution. The refractive index distribution in the direction perpendicular to the axis of the graded index type lens 92 of the optical plane circuit shown in FIG. 8 is similar to that shown in FIG. 5C.

Figure 11:
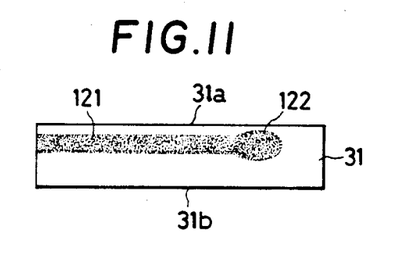
FIG. 11 is a side view of an optical plane circuit with an optical coupler according to still another embodiment of the present invention.

An optical plane circuit with an optical coupler according to still another embodiment of the present invention will now be described with reference to FIGS. 11 and 12. The optical plane circuit with an optical coupler having a graded index type lens as shown in FIG. 11 is manufactured by a method including a step shown in FIG. 12. As in the optical plane circuit shown in FIG. 8, the graded index type lens and the optical waveguide are buried in the substrate in the optical plane circuit shown in FIG. 11.

In the step shown in FIG. 12, the optical waveguide 36 and the graded index type lens 38 are formed within the transparent substrate 31, in the manner as described with reference to FIG. 4. Thereafter, the mask 33 is removed by polishing or dissolution. Masks 111 and 112 having the similar patterns to the aperture 32 and the hole 34 of the mask 33 are then formed on the front surface 31a of the substrate 31 in alignment with the optical waveguide 36 and the graded index type lens 38. Ions from the diffusion source 81 which serve to reduce the refractive indices of the optical waveguide 36 and the graded index type lens 38 to that of the transparent substrate 31 are diffused into the substrate 31 from the front surface 31a thereof. Since the ions are also diffused to the rear sides of the masks 111 and 112, an optical waveguide 121 and a graded index type lens 122 are buried within the transparent substrate 31.

The elements of the optical plane circuit shown in FIG. 11 manufactured in this manner have the refractive index distributions of semicircular shapes close to square approximation which are similar to those shown in FIGS. 10A and 10B. The distributions of the circuit shown in FIG. 11 are more symmetrical than those shown in FIGS. 10A and 10B.

Figure 9:
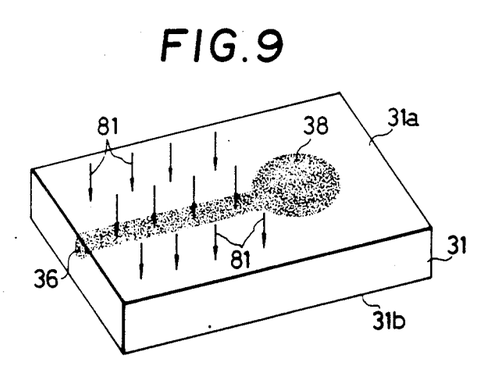
FIG. 9 is a perspective view showing a manufacturing step of the optical plane circuit with the optical coupler shown in FIG. 8.
Figure 12:
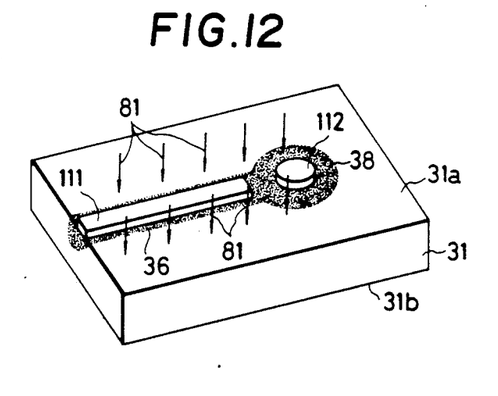
FIG. 12 is a perspective view showing a manufacturing step of the optical plane circuit with the optical coupler shown in FIG. 11.

If the transparent substrate 31 is a glass plate in the steps shown in FIGS. 4, 9 and 12, an ion-exchange treatment may be performed by application of an electric field so as to bury the optical waveguide and the graded index type lens deeper from the front surface of the substrate, to shorten the time required for the ion-exchange treatment, or to obtain a refractive index distribution of the desired shape.

Figure 13:
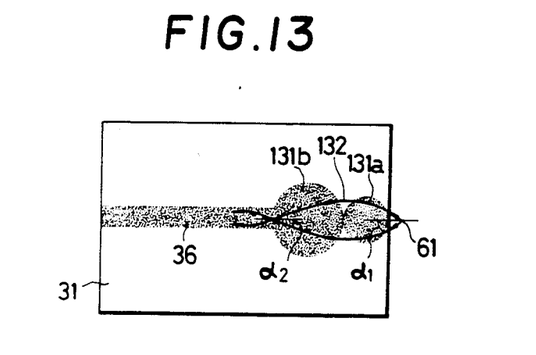
FIG. 13 is a plan view of an optical plane circuit with an optical coupler according to still another embodiment of the present invention.

In the embodiments shown in FIGS. 3, 8 and 11, only one graded index lens is formed in the transparent substrate 31. However, two graded index lenses or more may be formed. FIG. 13 shows an optical plane circuit with an optical coupler according to still another embodiment of the present invention wherein more than one graded index type lens is formed. In the optical plane circuit shown in FIG. 13, a graded index type lens 131a of a great numerical aperture and another graded index type lens 131b of a small numerical aperture are formed by varying the size of the hole 34 or the like. For this reason, light beams 132 incident on the lens with a great angle of incidence $\alpha_1$ may be converted into light beams of a small angle of incidence $\alpha_2$ which then become incident on the optical waveguide 36.

Figure 14:
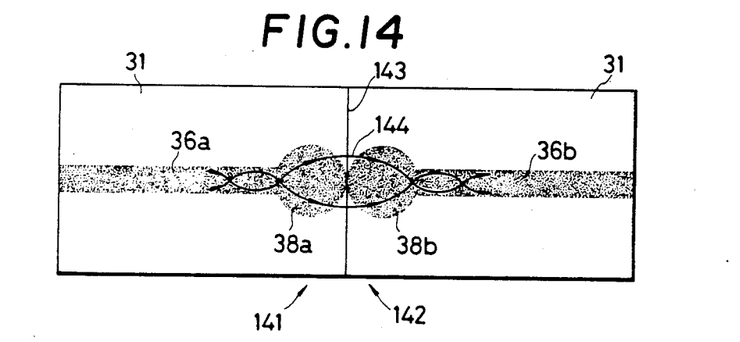
FIG. 14 is a plan view of an example of connection of two optical plane circuits with optical couplers according to the present invention.

FIG. 14 shows an example of connection of optical plane circuits 141 and 142 according to the present invention. Referring to FIG. 14, if optical coupling between graded index type lenses 38a and 38b is accomplished at a flat junction 143 through parallel light beams 144, registration may be achieved readily, resulting in small optical loss. Referring to FIG. 14, reference numerals 36a and 36b denote optical waveguides.

Figure 15:
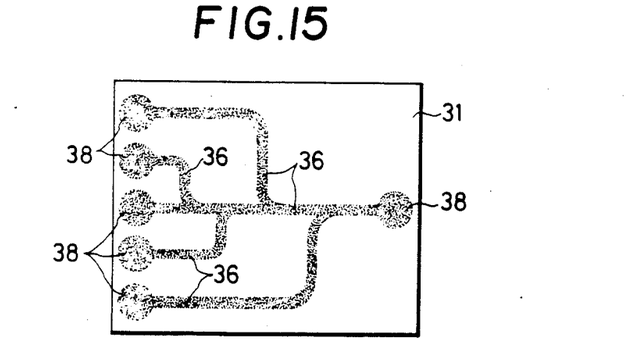
FIG. 15 is a plan view of an optical plane circuit with an optical coupler according to still another embodiment of the present invention.

FIG. 15 shows an optical plane circuit with an optical coupler according to still another embodiment of the present invention having a number of graded index type lenses and optical waveguides in a single substrate. According to this example, the graded index type lenses 38 are connected to both ends in one of the optical waveguides 36, whereas the graded index type lenses 38 are connected to only one ends each in other optical waveguides 36, the other ends of which are connected to the other optical waveguides 36. Referring to FIG. 15, the sizes, performance, and relative positions of the graded index type lenses; the shapes of the optical waveguides; and so on may be arbitrarily selected with high precision by means of masks of various shapes, thus allowing high integration.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope and spirit of the invention as defined in the appended claims.

what is claimed is:

1. An optical plane circuit with an optical coupler, comprising:
    a transparent substrate having a front surface and a rear surface;
    an optical waveguide formed by diffusion in said transparent substrate; and
    a graded index type lens formed by diffusion in said transparent substrate adjacent to one end of said optical waveguide and serving as said optical coupler for improving the input and/or output efficiency of a light beam in and/or from said optical waveguide wherein the width of said optical waveguide as viewed from said front surface is smaller than the length of said graded index type lens measured in the same direction as said width of said optical waveguide; wherein the maximum thickness of said graded index type lens in the direction perpendicular to said front surface is larger than that of said optical waveguide in said perpendicular direction; wherein said graded index type lens has a varying refractive index in said direction perpendicular to said front surface; and further wherein said optical waveguide and said graded index type lens are buried inside said transparent substrate so as not to be exposed to said front surface thereof.

2. An optical plane circuit according to claim 1, wherein at least one of said optical waveguide and said graded index type lens is exposed to said front surface of said transparent substrate.

3. An optical plane circuit according to claim 1, wherein said optical waveguide comprises a narrow band of a substantially constant width as viewed from said front surface of said transparent substrate.

4. An optical plane circuit according to any one of claims 1 to 3, wherein said optical waveguide comprises a linear pattern as viewed from said front surface of said transparent substrate.

5. An optical plane circuit according to any one of claims 1 to 3, wherein said optical waveguide comprises a curved pattern as viewed from said front surface of said transparent substrate.

6. An optical plane circuit according to any one of claims 1 to 3, wherein said optical waveguide comprises a combination of a linear pattern and a curved pattern as viewed from said front surface of said transparent substrate.

7. An optical plane circuit according to any one of claims 1 to 3, wherein said graded index type lens is circular as viewed from said front surface of said transparent substrate.

8. An optical plane circuit according to any one of claims 1 to 3, wherein said graded index type lens is elliptical as viewed from said front surface of said transparent substrate.

9. An optical plane circuit according to any one of claims 1 to 3, wherein said graded index type lens is formed contiguously with one end of said optical waveguide.

10. An optical plane circuit according to any one of claims 1 to 3, wherein said graded index type lens is formed next to one end of said optical waveguide with a predetermined distance therebetween.

11. An optical plane circuit according to claim 1, wherein said optical waveguide is exposed to said front surface of said transparent substrate, and the refractive index of said optical waveguide in the direction separating from a central line of said front surface perpendicularly with respect thereto continuously decreases by square approximation.

12. An optical plane circuit according to claim 11, wherein said graded index type lens is exposed to said front surface of said transparent substrate, and the refractive index in an axial direction of said graded index type lens continuously decreases by square approximation from said front surface to a rear surface of said transparent substrate.

13. An optical plane circuit according to claim 12, wherein said graded index type lens is exposed to said front surface of said transparent substrate, and the refractive index in a direction perpendicular to an axis of said graded index type lens continuously decreases by square approximation in a direction separating from the axis to form an overall semicircular distribution.

14. An optical plane circuit according to claim 1, wherein said optical waveguide is buried inside said transparent substrate below said front surface, and the refractive index of said optical waveguide in a direction from said front surface to said rear surface of said transparent substrate continuously increases first and then decreases to form an overall semicircular distribution.

15. An optical plane circuit according to claim 14, wherein said graded index type lens is buried inside said transparent substrate below said front surface thereof, and the refractive index in the axial direction of said graded index type lens continuously increases first and then decreases to form an overall semicircular distribution.

16. An optical plane circuit according to claim 15, wherein said graded index type lens is buried inside said transparent substrate below said front surface thereof, and the refractive index in a direction perpendicular to the axis of said graded index lens continuously decreases by square approximation away from the axis to form the overall semicircular distribution.

17. An optical plane circuit according to claim 16, wherein a plurality of said optical waveguides are formed in said transparent substrate.

18. An optical plane circuit according to claim 16, wherein a plurality of said graded index type lenses are formed in said transparent substrate.

19. An optical plane circuit according to claim 18, wherein a first graded index type lens is formed adjacent to one end of said optical waveguide, and a second graded index type lens is formed adjacent said first graded index type lens remote from said optical waveguide.

20. An optical plane circuit according to claim 19, wherein said first graded index type lens is greater in size than said second graded index type lens.

21. An optical plane circuit according to claim 1, wherein a plurality of optical waveguides are formed in said transparent substrate, and each end of each optical waveguide is adjacent to said graded index type lens or another one of said optical waveguides.

22. An optical plane circuit according to claim 21, wherein the refractive index of said optical waveguide remains the same in a longitudinal direction thereof.

23. An optical plane circuit according to claim 22, wherein a plurality of said transparent substrates each having said optical waveguide and said graded index type lens are coupled to each other by butting opposite side surfaces thereof to form junctions therebetween and a pair of said graded index type lenses oppose each other through each of said junctions.

24. An optical plane circuit according to claim 23, wherein said transparent substrate comprises a glass substrate containing ions of a first element which is capable of constituting a modified oxide glass, and said optical waveguide and said graded index type lens comprises a region wherein ions of a second element are substituted for the ions of the first element by diffusion, the ions of the second element having a greater tendency to increase a refractive index of said glass plate than the ions of the first element and being capable of constituting a modified glass or oxide.

25. An optical plane circuit according to claim 24, wherein said transparent substrate comprises a synthetic resin plate of a transparent polymer, and said optical waveguide and said graded index type lens comprises a region formed by diffusing a monomer which is capable of copolymerization with said polymer to increase a refractive index thereof and by copolymerizing said monomer with said polymer.

26. An optical plane circuit according to claim 25, wherein said graded index type lens is formed adjacent to one side surface of said transparent substrate.

27. A method for manufacturing an optical plane circuit with an optical coupler, comprising the steps of:
forming, on a surface of a transparent substrate, a diffusion mask layer of a predetermined pattern having a band-shaped aperture and a block-shaped hole adjacent to one end of said band-shaped aperture; and
diffusing a diffusion source, which increases a refractive index of said transparent substrate, in said transparent substrate through said diffusion mask layer, whereby in said transparent substrate are formed an optical waveguide comprising a region in which said diffusion source is diffused through said band-shaped aperture, and a graded index type lens comprising a region in which said diffusion source is diffused through said block-shaped hole and serving as said optical coupler for improving an input and/or output efficiency of a light beam in and/or from said optical waveguide.

28. A method according to claim 27, wherein said transparent substrate comprises a glass plate containing ions of a first element which is capable of constituting a modified glass oxide, and said diffusion source contains ions of a second element which contributes to increase a refractive index of said glass plate more than the ions of the first element and which is capable of constituting a modified oxide glass.

29. A method according to claim 27, wherein said transparent substrate comprises a synthetic resin plate of a transparent polymer, and said diffusion source contains a monomer which copolymerizes with said polymer to increase a refractive index thereof.

30. A method for manufacturing an optical plane circuit with an optical coupler, comprising the steps of:
forming, on a surface of a transparent substrate, a first diffusion mask layer of a predetermined pattern having a band-shaped aperture and a block-shaped hole formed at least adjacent to one end of said band-shaped aperture;
diffusing a first diffusion source, which increases a refractive index of said transparent substrate, in said transparent substrate through said first diffusion mask layer,
removing said first diffusion mask layer from said transparent substrate;
forming a second mask layer on said surface of said transparent substrate; and
diffusing a second diffusion source, which decreases the refractive index of said transparent substrate, into a shallow region of said transparent substrate, whereby in said transparent substrate are formed an optical waveguide corresponding to said region in which said first diffusion source is diffused through said band-shaped aperture and being buried below said surface of said transparent substrate, and a graded index type lens corresponding to said region in which said first diffusion source is diffused through said block-shaped hole, being buried below said surface of said transparent substrate, and serving as said optical coupler for improving an input and/or output efficiency of a light beam in and/or from said optical waveguide.

31. A method according to claim 30, wherein a second mask layer having a band-shaped mask portion of a shape substantially the same as or similar to said band-shaped aperture and a block-shaped mask portion of a shape the same as or similar to said block-shaped hole is formed on said transparent substrate, and said second diffusion source is diffused into said transparent substrate through said second mask layer.

32. A method according to claim 27, 28, 30, or 31, wherein said transparent substrate comprises a glass plate, and ions from said diffusion source are diffused into said transparent substrate while applying an electric field so as to accelerate diffusion of the ions.

* * * * *